United States Patent
Shapiro et al.

[15] 3,657,733
[45] Apr. 18, 1972

[54] SOLID STATE RING LASER

[72] Inventors: William A. Shapiro, Hackensack, N.J.; Robert P. Kemmerer, Jr., Bloomington, Calif.

[73] Assignee: The Bendix Corporation

[22] Filed: Aug. 25, 1969

[21] Appl. No.: 852,708

[52] U.S. Cl. ...................... 330/4.3, 331/94.5, 350/152
[51] Int. Cl. ............................. H01s 3/02, H01s 3/05
[58] Field of Search .................... 331/57, 94.5; 350/152; 330/4.3

[56] References Cited

UNITED STATES PATENTS

| | | |
|---|---|---|
| 3,308,395 | 10/1961 | Sorokin ........................ 331/94.5 |
| 3,414,839 | 12/1968 | Briges et al. ................... 350/160 |
| 3,462,708 | 8/1969 | McClure ........................ 331/94.5 |
| 3,504,300 | 3/1970 | Mazelsky ....................... 331/94.5 |

FOREIGN PATENTS OR APPLICATIONS

| | | |
|---|---|---|
| 1,128,162 | 9/1968 | England ........................ 331/94.5 |
| 1,388,843 | 1/1965 | France ......................... 331/94.5 |

OTHER PUBLICATIONS

Applied Physics Letters, May 1, 1968 Vol. 12, No. 9 by J. E. Geusic et al. Continuous 532-n Solid State Source Using $Ba_2NaNb_5-O_5$ Primary Examiner—Richard A. Farley
Assistant Examiner—N. Moskowitz
Attorney—Ronald G. Gillespie and Plante, Hartz, Smith and Thompson

[57] ABSTRACT

A solid state one-piece ring laser having a plurality of surfaces for converting broad band light to a ring laser beam. At least one surface is refractive and is arranged at a Brewster's angle to the ring laser beam to linearly polarize the ring laser beam. Some of the surfaces may be reflective and are arranged at critical angles to the ring laser beam. With this arrangement, none of the surfaces needs to be coated with a dielectric which deteriorates with age and environment. In a preferred arrangement, as many of the surfaces as possible are refractive to provide a more coherent laser beam.

2 Claims, 2 Drawing Figures

INVENTORS
WILLIAM A. SHAPIRO
ROBERT P. KEMMERER, JR

BY
Ronald G. Gillespie
ATTORNEY

SOLID STATE RING LASER

BACKGROUND OF THE INVENTION

1. Field of the Invention

The present invention relates to lasers and, more particularly, to solid state ring lasers.

2. Description of the Prior Art

Heretofore, ring lasers were constructed with gas filled tubes and with mirrors, which had to be accurately aligned. The laser had to be rugged for airborne use and this added bulk and weight which made its use impractical.

A toroidal solid state ring laser is disclosed in Laser Operation Without Spikes in a Ruby Ring, by Peter Walsh and G. Kemeny, at page 956 of Volume 34, number 4 of the April, 1963 issue of "Journal of Applied Physics." The toroidal ring laser overcomes the problems of the gas using ring lasers but provides a laser beam which is not highly coherent and requires dielectric coatings on the reflective surfaces which deteriorate with age and temperature change. Furthermore, the toroidal ring laser does not linearly polarize the laser beam.

SUMMARY OF THE INVENTION

A solid state ring laser responsive to broadband light to provide a highly coherent linearly polarized laser beam, comprising a body of lasing material having a plurality of surfaces arranged to convert the broadband light to a ring laser beam. At least one surface is refractive to linearly polarize the ring laser beam and one of the surfaces is partially reflective and partially refractive to convert the ring laser beam to a laser beam.

One object of the present invention is to provide a ring laser providing linearly polarized laser beams.

Another object of the invention is to provide a solid state one-piece ring laser which is economical and rugged.

Another object is to arrange refractive surfaces at Brewster's angle to the beam and reflective surfaces substantially at the critical angle to avoid coating the surfaces with a dielectric which deteriorates and causes unsatisfactory operation.

The aforegoing and other objects and advantages of the invention will appear more fully hereinafter from a consideration of the detailed description which follows, taken together with the accompanying drawings wherein two embodiments of the invention are illustrated by way of example. It is to be expressly understood, however, that the drawings are for illustration purposes only and are not to be construed as defining the limits of the invention.

DESCRIPTION OF THE INVENTION

Figure 1:
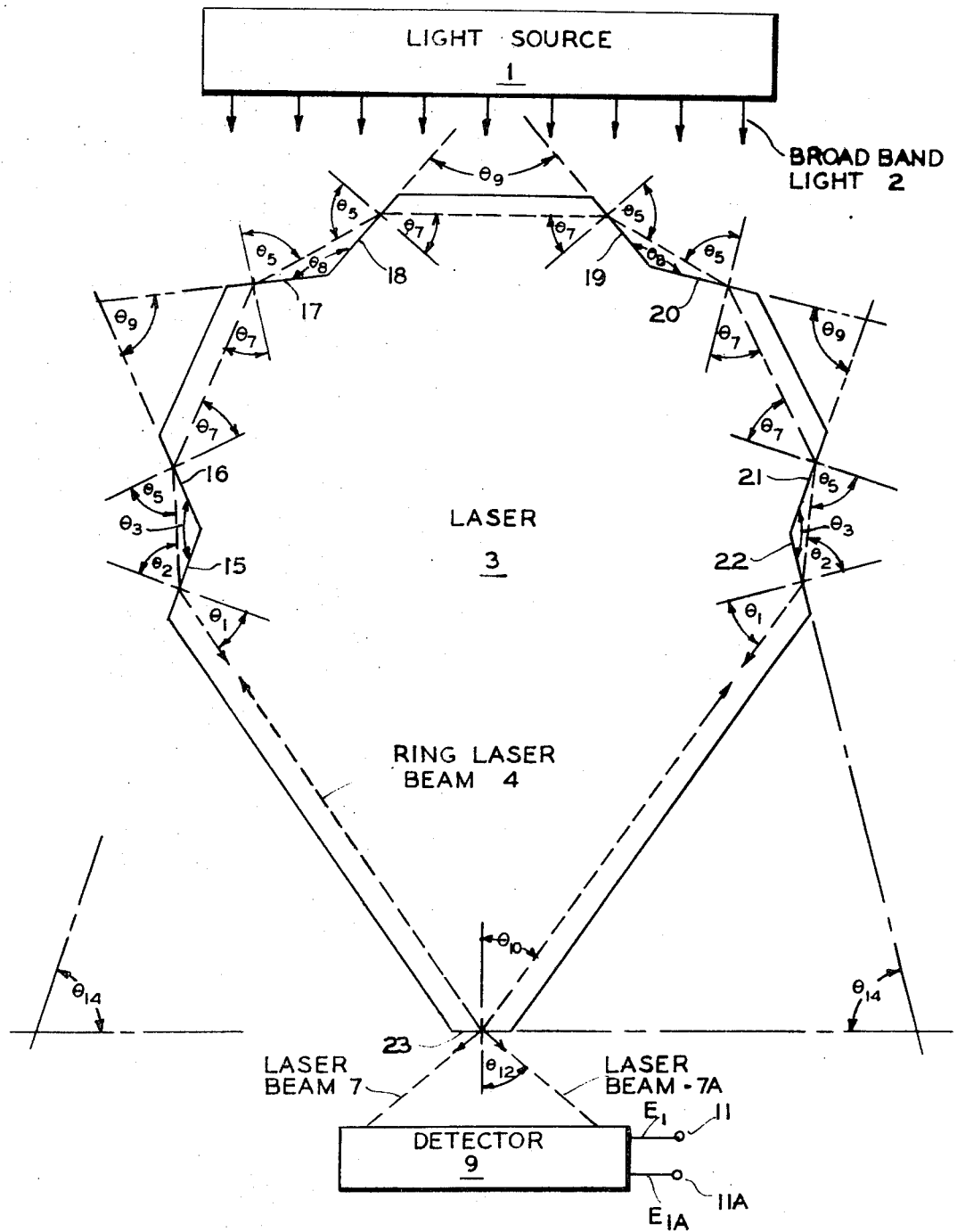
FIG. 1 shows a laser system constructed in accordance with the present invention using a solid state one-piece ring laser in which substantially all the light coherent surfaces are refractive.

Referring to FIG. 1 there is shown a laser system having a light source 1, such as a xenon tube, which transmits broad band light 2 to a solid state one-piece ring laser 3, constructed according to the invention to provide a bi-directional, as indicated by the arrows, ring laser beam 4.

Ring laser beam 4 is converted to laser beams 7, 7A which may be used directly in any conventional manner or may be applied to a detector 9 to provide alternating current voltages $E_1$ and $E_{1A}$ at output terminals 11 and 11A, respectively, which may correspond to rotation rates of the ring laser as described in U.S. Pat. No. 3,320,850.

Ring laser 3 comprises a body in which the active medium preferably is ruby although other material such as neodymium glass and neodymium yttrium aluminum garnet may be used. The active medium determines the wave length of the ring laser beam. The refractive index of the active medium determines the minimum number of lasering legs and the number of refractive and reflective surfaces necessary to provide the ring laser beam.

Using ruby as the active medium, the ring laser beam 4 will have a wave length of 6,943 A. and ring laser 3 has refractive surfaces 15 to 22 and a partially reflective surface 23 which directs light of this wave length in a closed path, as indicated by the dotted line of ring laser beam 4, in opposite directions. The portion of internal radiation, caused by light 2, following the closed path is continually reinforced by subsequent radiation to provide a ring laser beam 4. The remainder of the internal radiation that does not follow the closed path is dissipated in laser 3.

Surfaces 16, 18 and 20 are arranged at an angle of 59° 12' to surfaces 17, 19 and 21 so that the angle of incidence of ring laser beam 4 to those surfaces is at Brewster's angle $\theta_5$ of 60° 24' from air to ruby and $\theta_7$ of 29° 36' from ruby to air. The use of Brewster's angles avoids the use of dielectric coatings on the surfaces.

Brewster's angles are determined by the refractive indicies of the different mediums and the wave length of the ring laser beam. In the present arrangement the refractive index of ruby at the lasing wave length of 6,439 A. is approximately 1.76 and the refractive index for air is approximately 1 so that the Brewster's angle from air to ruby is 60° 24' as indicated above. The Brewster's angle from ruby to air is 29° 36'.

As ring laser beam 4 is refracted at the Brewster's angle from one medium to another, it is linearly polarized and the number of times ring laser beam 4 is refracted determines the extent of linear polarization of ring laser beam 4.

A highly linearly polarized laser beam is especially desirable in holography and as a rotation rate detector.

Surfaces 15 and 22 are arranged at an angle $\theta_3$ of 121° 16¼' to surfaces 16 and 21, respectively, so that ring laser beam 4 strikes surfaces 15 and 22 at near Brewster's angle $\theta_1$ of 29° 46' from ruby to air and $\theta_2$ of 60° 52¼' from air to ruby. Surfaces 15 and 23 and surfaces 22 and 23 are arranged at an angle $\theta_{14}$ of 64° 18½' so that the angle of incidence of laser beam 4 to surface 23 is at an angle $\theta_{10}$ of 34° 32½' which is substantially the critical angle. This provides a high degree of reflection without the use of dielectric coating and permits a small portion of ring laser beam 4 to be refracted at an angle $\theta_{12}$ of 86° 16¾' to detector 9.

Figure 2:
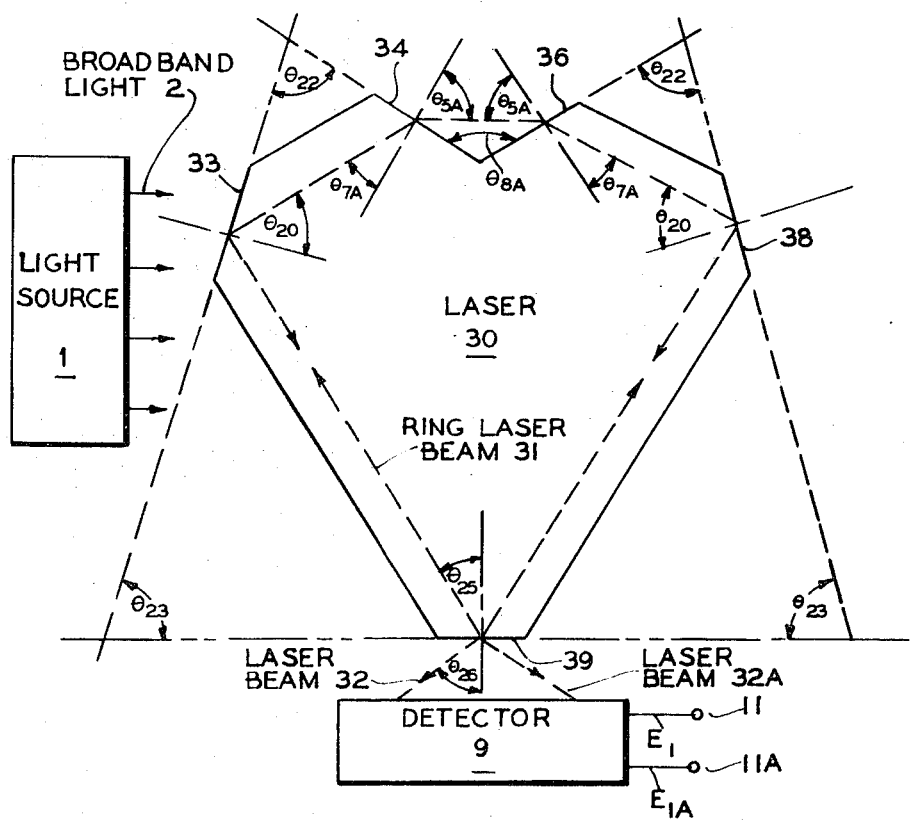
FIG. 2 shows a second embodiment of the invention which includes only two refractive surfaces.

The laser system shown in FIG. 2 is similar to the laser system shown in FIG. 1 except that a ring laser 30, which receives broad band light 2 from light source 1 and provides a ring laser beam 31, has two refractive surfaces 33 and 38 and a partially reflective surface 39, the latter surface also refracting a portion of ring laser beam 31 to detector 9. Reflective surfaces 33 and 38 of laser 30 are arranged at an angle $\theta_{22}$ of 75° 36' to refractive surfaces 35 and 36, respectively, so that the angle of incidence of ring laser beam 31 to surfaces 34, 36 is at a Brewster's angle $\theta_{5A}$ of 60° 24' from air to ruby and $\theta_{7A}$ of 29° 36' from ruby to air, and the angle of incidence of ring laser beam 31 to reflective surfaces 33 and 38 is at a critical angle $\theta_{20}$ of 45°.

Partially reflective surface 39 preferably has a dielectric coating to increase the reflectivity of the surface so that approximately 80 percent of ring laser beam 31 is reflected and the remainder is refracted by surface 39 at an angle $\theta_{26}$ of 56° to provide linearly polarized laser beams 32 and 32A which may be used in a conventional manner.

The one-piece solid state ring laser constructed according to the invention is economical and rugged and provides a linearly polarized laser beam. The refractive surfaces arranged at Brewster's angles and the reflective surfaces arranged at substantially the critical angle avoid coating the surfaces with the dielectric to improve operation and increase the life of the ring laser.

While two embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A solid state ring laser responsive to broad band light and providing a linearly polarized laser beam, comprising:
    a body of lasing material having a plurality of surfaces arranged to convert the broad band light to a ring laser beam;
    the plurality of surfaces including four pairs of adjacent refractive surfaces for linearly polarizing the ring laser beam; and
    one of the surfaces being partially reflective and partially refractive to convert the ring laser beam into a laser beam.

2. A solid state ring laser responsive to broad band light and providing a linearly polarized laser beam comprising:
    a body of lasing material having a plurality of surfaces arranged to convert broad band light to a ring laser beam;
    the plurality of surfaces including one pair of adjacent refractive surfaces for linearly polarizing the ring laser beam and two reflective surfaces arranged at critical angles to the ring laser beam to achieve a high degree of reflectivity without the use of a dielectric coating; and
    one of the surfaces being partially reflective and partially refractive to convert the ring laser beam into a laser beam.

* * * * *